United States Patent [19]
Snyder et al.

[11] Patent Number: 5,362,816
[45] Date of Patent: Nov. 8, 1994

[54] HIGH COHESIVE STRENGTH PRESSURE-SENSITIVE ADHESIVES INCORPORATING ACETOACETATE

[75] Inventors: Barry S. Snyder, Dresher; Daniel A. Bors, Warminster, both of Pa.

[73] Assignee: Rohm and Haas Company, Philadelphia, Pa.

[21] Appl. No.: 894,124

[22] Filed: Jun. 4, 1992

[51] Int. Cl.$^5$ .............................. C08F 8/32; C09J 7/02
[52] U.S. Cl. .................... 525/329.9; 428/355; 428/524; 525/330.5; 525/378; 525/379; 525/380; 526/931
[58] Field of Search ............. 525/329.9; 526/931; 428/355

[56] References Cited
U.S. PATENT DOCUMENTS

| | | | |
|---|---|---|---|
| 4,048,214 | 9/1977 | Wilke | 560/128 |
| 4,540,739 | 9/1985 | Midgely | 524/764 |
| 4,677,167 | 6/1987 | Goel | 525/375 |
| 4,759,983 | 7/1988 | Knutson | 428/343 |
| 4,906,684 | 3/1990 | Say | 524/548 |
| 4,908,403 | 3/1990 | Spada | 524/818 |
| 5,053,452 | 10/1991 | Spada | 524/707 |
| 5,071,914 | 12/1991 | Zimmel | 525/113 |

FOREIGN PATENT DOCUMENTS

| | | |
|---|---|---|
| 0492847 | 7/1992 | European Pat. Off. . |
| 1185216 | 7/1988 | United Kingdom . |

OTHER PUBLICATIONS

R. T. Morrison and R. N. Boyd, "Organic Chemistry", 4th Ed., 1031–33, (1983) Allyn and Bacon (Boston).
V. Neufeldt and D. B. Guralnik, "Webster's New World Dictionary", 3rd College Edition, 998, (1988) Simon and Schuster (New York).

*Primary Examiner*—Fred Zitomer
*Attorney, Agent, or Firm*—James G. Vouros

[57] ABSTRACT

A pressure-sensitive adhesive having improved shear strength obtained by virtue of the formation of the enamine of a pendent acetoacetate is described. These materials contain acetoacetate functional monomer in a low Tg emulsion polymer. Shear strength is improved without compromise of either peel strength or tack.

4 Claims, No Drawings

HIGH COHESIVE STRENGTH PRESSURE-SENSITIVE ADHESIVES INCORPORATING ACETOACETATE

BACKGROUND OF THE INVENTION

The present invention relates to pressure-sensitive adhesives and to articles containing such adhesives.

Pressure-sensitive adhesives are commonly used in the preparation of numerous articles, including adhesive tapes and other systems wherein ready attachment of two components under only an applied pressure is desirable. The performance of pressure-sensitive adhesives comprises a balance of three properties: peel resistance (a measure of adhesion), tack and shear strength (a measure of cohesion). In general, any system perturbation which serves to improve peel and tack results in a depletion of shear strength. Conversely, any change which improves shear strength has the effect of hurting peel and tack. In addition, other properties, such as clarity and color stability of the ultimate film prove to be of importance.

A wide variety of polymeric compositions have been found to be useful as pressure-sensitive adhesives when applied to a substrate. Polymers may be applied in several forms, as solutions, emulsions or as hot melts. The key property for a number of these applications is the attainment of very high shear strength. A number of methodologies have been described which allow for the preparation of polymeric systems which achieve this high shear strength. In general, these methodologies suffer from reduction in peel and tack which accompanies this enhanced shear. Increases in polymer molecular weight may serve to improve shear strength at the expense of peel and tack. Incorporation of highly polar monomers, such as polymerizable carboxylic acids, or the inclusion of cross-linking monomers, such as N-methylol acrylimide, may also provide increased shear strength with the concomitant loss of peel and tack.

An approach which has been extensively documented is that of incorporation of metal crosslinks into the adhesive composition. U.S. Pat. No. 4,540,739 describes the use of alkali metal hydroxides as neutralizing agents in the preparation of high shear pressure-sensitive adhesives. Treatment with polyvalent metals to prepare crosslinked films has been described in U.S. Pat. No. 2,754,280. However, peel and tack are compromised.

U.S. Pat. No. 4,812,541 describes a high performance pressure-sensitive adhesive composition which includes a combination of glycidyl and N-vinyl lactam monomers. The resulting polymer system was found to exhibit a good balance of adhesion to aluminum and high cohesion.

A recent disclosure, U.S. Pat. No. 4,759,983, describes the use of a functional monomer of the following formula:

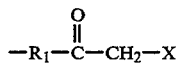

in which $R_1$ is a divalent organic radical at least 3 atoms in length, and X is organoacyl or cyano. Incorporation of such monomers was found to lend improved shear strength to adhesive polymer compositions without significant compromise of peel and tack. All examples of U.S. Pat. No. 4,759,983 are run at a pH from 4 to 6.5 adjusted with either ammonia or sodium hydroxide. U.S. Pat. No. 4,908,403 discloses treating the above systems with an acid-containing component to further increase the shear strength of the resultant adhesive polymer. U.S. Pat. No. 4,908,403 states a preference for acidic pH values.

In U.S. 4,540,739 data is presented which shows that neutralizing adhesive emulsion polymers to a pH of 8.5 to 10, with non-permanent bases such as ammonium hydroxide, does not affect the shear strength of the resultant adhesive film. Neutralization with sodium hydroxide produced significant improvement in shear.

SUMMARY OF THE INVENTION

It has been found that the polymeric systems described in Knutson, et al. (U.S. Pat. No. 4,759,983), which themselves were found to exhibit enhanced shear strength, can be further improved by maintenance of pH in the range of 8-10 with either ammonia or a primary amine. Pressure-sensitive adhesives of this type do not require the use of crosslinking agents and/or catalysts, although they may contain such materials. Thus, pressure-sensitive adhesives, and articles containing pressure-sensitive adhesives, exhibiting improved shear strength in the absence of depleted peel and tack can be obtained by incorporation of pendent functional groups of the following type:

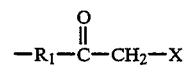

where $R_1$ is a divalent organic radical at least 3 atoms in length, and X is organoacyl or cyano, into a polymer have a $T_g$ of about 0° C. or less. Treatment with ammonia or primary amine of sufficient quantity to form the enamine, resulting in a final pH of approximately 8-10 serves to further improve the shear strength, and imparts improved die cuttability to the prepared articles. The stability of the pendent groups to hydrolysis is also increased by virtue of this process. Different $R_1$ and X groups may be combined within the same polymer, or polymers containing the various $R_1$ and X groups may be blended into the same dispersion. The adhesive polymers may be prepared in aqueous dispersion and are applied to substrates in this form.

DETAILED DESCRIPTION OF THE INVENTION

In its preferred embodiment, this invention results in a high cohesive strength pressure-sensitive adhesive, without the need for added crosslinking agents. The preferred polymers for use in this invention are vinyl polymers with pendant acetoacetate groups, although pendent groups of the general form:

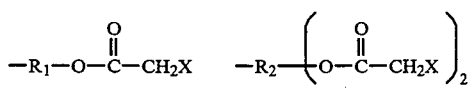

where X is an organoacyl or cyano, may be used. The term "pendent" is used in the specification to mean "attached to the polymer backbone and available for further reaction." Pendent should not be read in the strict sense which would exclude the attachment of such groups at the termini of a polymer chain. Thus, polymer having acetoacetate functionality introduced on the chain end by an acetoacetate functional mercaptan as taught in U.S. Pat. No. 4,960,924 would be useful in this invention. Generally, the pendent acetoacetate groups are attached to the polymer backbone via an organic divalent radical $R_1$ which in turn is attached to the acetoacetate moiety or by a trivalent organic radical $R_2$ bearing two acetoacetate groups.

The balance of the polymer composition is selected from known monomers to produce polymers having pressure-sensitive adhesive properties. Preferably, these monomers are selected from (1) conjugated diolefin polymers comprising at least about 50 weight percent of one or more conjugated diene monomers having 4 to about 8 carbon atoms and 0 to about 50 weight percent of one or more alkenyl-substituted monoaromatic monomers, (2) olefin ester interpolymers comprising at least about 1 weight percent of a mono-olefin monomer having up to about 4 carbon atoms and at least about 40 weight percent of an alkenyl or alkenol ester of a saturated carboxylic acid, (3) olefinically unsaturated carboxylic acid ester polymers comprising at least about 40 weight percent polymerized olefinically unsaturated carboxylic acid ester monomers, (4) alkenyl ether polymers containing at least about 30 weight percent alkenyl ether monomer units, and (5) combinations thereof.

The acetoacetate polymers can be prepared by means known in the art. A preferred method is polymerization through incorporation which includes an acetoacetate functional monomer. A preferred monomer is acetoacetoxyethyl methacrylate which is conveniently referred to throughout this specification as AAEM, show below.

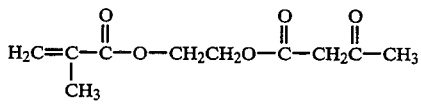

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with diketene or other suitable acetoacetylating agent (See e.g. *Comparison of Methods for the Preparation of Acetoacetylated Coating Resins*, Witzeman, J. S.; Dell Nottingham, W.; Del Rector, F. J. Coatings Technology; Vol. 62, 1990, 101 (and references contained therein)).

The useful pressure-sensitive adhesive polymers contain a sufficient amount of one or more of the described functional monomers to improve the cohesive strength of the adhesive relative to an otherwise identical pressure-sensitive adhesive without the functional monomer. Generally, amounts of from about 0.05 weight percent to about 10 weight percent are used, usually from about 0.5 percent to about 5 weight percent, and preferably from 1 to 5 percent. Ultimately, the amount of functional monomer will vary from case to case as the properties of the particular polymer dictate the necessary amount of material.

While the inclusion of the appropriate functional monomer has been disclosed in Knutson, et al., they suggest that the optimal range of pH is 4 to 6.5, achieved via neutralization with either ammonium hydroxide or sodium hydroxide. It has been found, and is the subject of the present invention, that adjustment of the pH to 8 to 10 with either ammonia or a primary amine produces a surprising further improvement in the cohesive strength of the resulting adhesive. Additional impetus for this treatment lies in the fact that vinyl polymers containing pendent acetoacetate are prone to hydrolysis in water, particularly on heat aging. The hydrolysis occurs at nearly any pH and yields acetoacetic acid, which in turn decomposes to acetone and carbon dioxide.

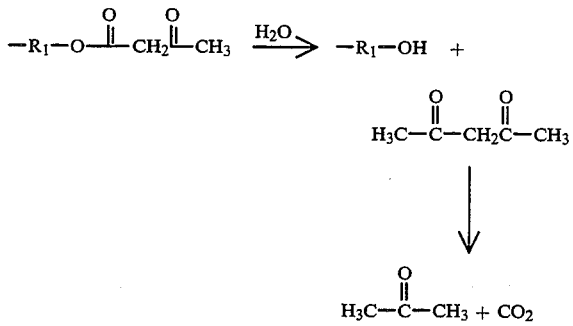

We have found, however, that this problem may be eliminated by treating the aqueous acetoacetate polymer, after preparation and neutralization, with one molar equivalent of ammonia or a primary amine such as ethanolamine, methyl amine, or isopropyl amine. Typically, the polymer is first neutralized to a basic pH, preferably a pH greater than 9, before adding the one molar equivalent for enamine formation. Under these conditions, the enamine is formed. The reaction to form the enamine is generally rapid with the rate of formation increasing with temperature. In general, enamine formation is complete within 24 hours. The enamine is stable to hydrolysis. The amount of ammonia or amine used should be at least equivalent to the amount of acetoacetate in the polymer. Sterically hindered primary amines such as t-butyl amine and aromatic amines such as aniline are not suitable because of incomplete enamine formation.

Another approach to preparation of vinyl polymers containing equivalent pendent enamine functionality is to use preformed enamine monomers derived from the appropriate amine and the acetoacetate monomer. In this case, the pH must be kept on the alkaline side during polymerization to avoid hydrolysis of the enamine back to the acetoacetate.

Presently preferred polymers which contain the above-described functional monomers include (1) copolymers of substituted or unsubstituted alkenyl aromatic monomers and conjugated diolefins, (2) olefin ester interpolymers of $C_{2-4}$ monoolefins and $C_{2-8}$ alkenyl or alkenol esters of $C_{1-2}$ saturated carboxylic acids, (3) polymerized alkyl and alkanol esters of olefinically unsaturated carboxylic acids, (4) alkenyl ether homopolymers and interpolymers of $C_{2-10}$ olefin ethers of $C_{1-10}$ alcohols, and (5) combinations thereof. In addition to the above-described functional monomers, each of these preferred classes of polymers can contain additional monomers such as olefinically unsaturated mono- and polycarboxylic acids, amides, aldehydes, etc.

Illustrative polymers of esters of olefinically unsaturated carboxylic acids are described by Midgley in U.S. Pat. No. 4,540,739 (1985), the disclosure of which is incorporated herein by reference. These polymers comprise, primarily, one or more polymerized, olefinically unsaturated mono- and/or polycarboxylic acid esters, and optionally may contain other polymerized monomers. Thus, the ester polymers usually contain at least about 40 weight percent, often at least about 60 weight percent, and preferably at least about 80 weight percent polymerized olefinically unsaturated carboxylic acid ester monomers other than the above described functional monomers. Presently preferred ester monomers are esters of olefinically unsaturated mono- and polycarboxylic acids having 4–17 carbon atoms, and hydroxyamino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic, itaconic, etc. Illustrative hydroxy-, amino-, and thio-substituted alcohols, amines and thiols are glycerol, 1-hydroxy-5-thiododecane, 2 amino-5-hydroxyhexane, etc. Presently preferred esters, due primarily to cost and availability, are hydroxy-substituted and unsubstituted alcohol esters of acrylic and methacrylic acids such as butyl acrylate, 2-ethylhexyl acrylate, methyl methacrylate, hydroxyethyl acrylate, etc.

A variety of olefinically unsaturated carboxylic acid ester monomers, as well as a variety of other polymerizable olefinically unsaturated monomers useful for the manufacture of pressure-sensitive adhesive polymers, and the interrelationship of these monomers to polymer $T_g$ (glass transition temperature), are discussed in the Handbook of Pressure-Sensitive Adhesive Technology, Van Nostrand-Reinhold Company, New York, 1983, particularly pages 298 through 329, including the references cited therein, the disclosures of which are incorporated herein by reference in their entireties. The principal characteristic of pressure-sensitive adhesives based on such carboxylic acid ester homo- or interpolymer is the low glass transition temperature ($T_g$) which can be achieved, in some instances, with carboxylic acid ester homopolymers but is usually obtained by polymerizing "hard" ester monomers with suitable proportions of "soft" ester monomers to form a polymer having the $T_g$ best suited for the particular application. So called "hard" monomers are those which produce homopolymers having relatively high $T_g$s, while "soft" monomers are those which form homopolymers having relatively low $T_g$s. For instance, acrylate monomers are typically "softer" than the corresponding methacrylic acid esters. Thus, n-butyl acrylate, 2-ethylhexyl acrylate and n-octyl acrylate are commonly employed "soft" monomers while various methacrylates, including methyl, isopropyl, n-butyl, and t-butyl methacrylate, are typical "hard" monomers.

The described functional monomers and olefinically unsaturated carboxylic acid ester monomers can constitute the total composition of this polymer class, or the portion of the polymer molecule not accounted for by those two monomer classes can be any polymerizable olefinically unsaturated monomer or combination of such monomers. Illustrative of other polymerizable monomers are vinyl esters of carboxylic acids, the acid moiety of which contains from 1 to about 20 carbon atoms (e.g., vinyl acetate, vinyl propionate, vinyl isononanoate); aromatic or aliphatic, alpha-beta-unsaturated hydrocarbons such as ethylene, propylene, styrene, and vinyl toluene; vinyl halides such as vinyl chloride and vinylidene chloride; olefinically unsaturated carboxylic acids having up to 10 carbon atoms such as acrylic, methacrylic, crotonic, itaconic, and fumaric acids, and the like.

The conjugated diolefin polymers typically contain about 0.5 to about 50 weight percent of one or more vinyl aromatic monomers and about 50 to about 99 weight percent of one or more conjugated diolefins having 4 to about 8 carbon atoms. These copolymers may be either random or block interpolymers. Illustrative alkenyl aromatic monomers include styrene, alpha-methylstyrene, p-methyl styrene, chlorostyrene, methyl-bromostyrene, etc. Illustrative conjugated diolefin monomers include butadiene, isoprene, etc. The alkenyl aromatic monomer is preferably present at a concentration of about 5 to about 70 weight percent, most preferably about 20 to about 50 weight percent, while the conjugated diolefin monomer is typically present at a concentration of about 30 to about 95 weight percent, most preferably about 50 to about 80 weight percent.

As in the case of the olefinically unsaturated carboxylic acid ester polymers discussed above, the conjugated diolefin polymers can contain various other monomers, in addition to the above described functional monomers, such as the vinyl esters of carboxylic acids, mono-olefins, olefinically unsaturated nitriles, olefinically unsaturated carboxylic acids, etc., discussed above with regard to the olefinically unsaturated carboxylic acid ester interpolymers. Furthermore, the conjugated diolefin polymers can contain up to about 40 weight percent, typically up to about 20 weight percent, of olefinically unsaturated carboxylic acid ester monomer units such as those described above for use in production of the useful carboxylic acid ester interpolymers.

The olefin ester polymers typically contain about 10 to about 40 weight percent of a $C_{2-4}$ monoolefin monomer, from about 50 to about 99.5 weight percent of a $C_{2-8}$ alkenyl or alkenol ester of a $C_{1-12}$ saturated carboxylic acid and about 0.5 to about 10 weight percent of a functional monomer as described above. Preferably, the monoolefin monomer is present in an amount from about 1 to 25 weight percent, most preferably from about 10 to 15 weight percent. Illustrative monoolefins are ethylene, propylene, and butylene, with ethylene being preferred.

The ester component of the olefin ester polymers is preferably a $C_{2-8}$ alkenyl or alkenol ester of a $C_{1-12}$ saturated carboxylic acid. Illustrative $C_{2-8}$ unsaturated alcohols and diols which can be reacted with $C_{1-12}$ saturated carboxylic acids to form reactive esters are $C_{2-8}$ alkenols such as propenol, butenol, pentenol, hexenol, heptenol and octenol and their diol homologues. Suitable saturated acids include formic, acetic, propionic, butanoic, valeric, caproic, heptanoic and octenoic acids. The most common of the foregoing esters are vinyl acetate, vinyl propionate and vinyl butanoate.

The alkenyl ether polymers typically contain at least about 30 weight percent, preferably at least 50 weight percent, polymerized alkenyl ether monomer units in which the alkenyl group has at least 2 carbon atoms, typically 2 to about 10 carbon atoms, and the alcohol (hydrocarbyl-oxy) group has from 1 to about 10 carbon atoms. Illustrative are methylvinyl ether, n-octyl-1-propenyl ether, 2,4-dimethylbutyl-2-hexenyl ether, vinylphenyl ether, etc.

The polymers encompassed by the four general classes described above can contain minor amounts, e.g. up to 30 weight percent, of one or more additional monomers, and they can be grafted or reacted with other chemical agents to modify their chemical composition. Thus, the polymers of groups (1) and (3) may contain minor amounts of substituted and unsubstituted monoolefin monomers such as ethylene, isobutylene, chlorobutenes, acrylonitrile, vinyl ethers, alkenyl esters of saturated carboxylic acids, etc. The conjugated diolefin polymers (group 1) may also contain olefinically unsaturated carboxylic acid ester monomers, and the olefinically unsaturated acid ester polymers (group 3) may contain conjugated diolefin and/or alkenyl monoaromatic monomers. Similarly, the alkenyl ester polymers of group (2) and alkenyl ether polymer of group (4) can contain substituted and/or unsubstituted conjugated diolefins, alkenyl aromatics, olefinically unsaturated carboxylic acid esters, etc.

It has been found that minor amounts of olefinically unsaturated mono- and polybasic carboxylic acids and/or sulfoalkyl esters of such carboxylic acids significantly improve cohesive strength of the PSA polymers. Thus, it is presently preferred that the polymers contain at least about 0.1 weight percent, usually about 0.1 to about 10 weight percent, and preferably about 0.1 to about 5 weight percent of a polymerizable, olefinically unsaturated carboxylic acid having up to about 10 carbon atoms and/or a sulfoalkyl esters of such acids, e.g. sulfoethyl methacrylate, sulfoethyl itaconate, sulfomethyl malonate, etc.

It has been found that suitable adhesive properties can be achieved without crosslinking or hardening agents such as aldehyde hardeners (e.g., formaldehyde, mucochloric acid, etc.), crosslinking catalysts such as the strong base catalysts discussed by Bartman in U.S. Pat. No. 4,408,018, acid catalysts such as phosphoric or methane sulfonic acid, complexing agents such as metals and metal compounds and complexes, or reactive monomers (e.g., glycols, polyamides, etc.). Since such hardening agents increase the complexity and expense of polymer manufacture, they are not required to obtain the necessary pressure-sensitive properties with the polymers of this invention and, in many instances, the incorporation of such "hardening" agents impairs other desirable PSA properties such as tack and adhesion, the preferred polymers are substantially free of such hardening agents or their residues. Nevertheless, minor amounts of such materials can be present.

Polymer molecular weight can have a significant effect on the balance of pressure-sensitive adhesive properties in polymers of a given monomer composition, i.e., polymers of identical monomer content. Thus, as discussed in the Handbook of Pressure-Sensitive Adhesive Technology, for instance, at pages 307–311, shear resistance is roughly proportional to molecular weight up to relatively high molecular weights at which shear resistance drops off dramatically in some polymers. Tack is typically high at very low molecular weights and decreases gradually as molecular weight is increased after a molecular weight value yielding optimum tack is exceeded. Adhesion typically exhibits discontinuous behavior, increasing with molecular weight up to moderate molecular weight levels and then gradually decreasing as molecular weight is increased further. The polymers useful in the adhesives of this invention typically have number average molecular weights of at least 10,000, generally within the range of about 10,000 to about 1,000,000 as determined by gel permeation chromatography. Such polymers have relatively high shear values and a favorable balance of other properties including peel and tack. Thus, the adhesives typically have shear holding values of at least 20 minutes, typically at least about 1 hour and, in high shear formulations, as much as 50 hours or more measured at 75° F., under 1000 gram loading as described hereinafter. Peel values are generally at least about 15, most often at least about 25, and preferably at about 35 ounces per inch width. Yet the high shear and peel values of these pressure-sensitive adhesives are not achieved at the expense of significant, if any, loss of tack. Thus, the polymers generally have probe tack values of at least about 300 grams, more generally at least about 500 grams. For the purposes of this disclosure, shear strength, peel adhesion, and probe tack are determined as described hereinafter in the illustrative examples, unless otherwise specified.

Many of the polymers useful in this invention exhibit sufficient tack for many PSA applications without added tackifiers, although the conjugated diolefin polymers generally require tackifiers to posses tack sufficient for many applications. Illustrative of polymers which are usually employed with tackifiers are conjugated diolefin polymers and their interpolymers, such as polymers and interpolymers of isoprene, butadiene, etc., in the presence or absence of other monomers, e.g., styrene. On the other hand, the polyalkenyl ether and olefinically unsaturated carboxylic acid ester polymers, and interpolymers of olefins and alkenyl carboxylic acid esters usually exhibit sufficient tack, in the absence of tackifiers, to be useful as pressure-sensitive adhesives. Nevertheless, adhesives based on such polymers also may contain compatible tackifiers to provide increased tack if desired.

The adhesive may contain very minor amounts of tackifiers to increase tack only slightly, or they may contain up to 150 weight parts or more of tackifier per 100 weight parts of one or more of the described polymers. Suitable tackifiers include rosins, hydrogenated rosins, esters of such rosins, synthetic hydrocarbon tackifiers and low molecular weight and low $T_g$ polycarboxylic acid esters. Typical rosins and hydrogenated rosin ester tackifiers have ring and ball softening temperatures of about 20° C. to about 115° C., while preferred tackifiers have softening temperature of about 50° C. to about 110° C. Useful hydrocarbon tackifiers may be manufactured from $C_9$ aromatic monomers or from $C_5$ aliphatic monomers and mixtures of such aromatic and aliphatic monomers. Such monomers are usually derived from the so called $C_9$ and $C_5$ cuts in the fractionation of crude oil or similar material. Such synthetic hydrocarbon tackifiers generally have ring and ball softening temperatures of about 10° C. to about 100° C. The polycarboxylic acid ester tackifier resins are polymerized from one or more monomers such as acrylic acid which is substituted or unsubstituted with alkyl or alkoxyl radicals having one to four carbon atoms or with alkyl or alkanol esters of such acids in which the alkyl or alkanol moiety has from one to about six carbon atoms.

The useful polymers can be prepared by free radical emulsion polymerization methods known in the art including batch, continuous and semicontinuous procedures. For the purposes of this disclosure, free radical polymerization methods intended to include radiation polymerization techniques. Illustrative free radical polymerization procedures suitable for preparing aqueous polymer emulsions involve gradually adding the monomer or monomers to be polymerized simultaneously to an aqueous reaction medium at rates proportionate to the respective percentage of each monomer in the finished polymer and initiating and continuing polymerization with a suitable free radical polymerization catalyst. Optionally, copolymers can be obtained by adding one or more comonomers disproportionately throughout the polymerization so that the portions of the polymers formed during the initial polymerization stage comprise a monomer composition differing from that formed during intermediate or later stages of the same polymerization. For instance, a styrene-butadiene copolymer can be formed by adding a greater proportion or all of the styrene during the initial polymerization stages with the greater proportion of the butadiene being added later in the polymerization.

Illustrative free-radical catalysts are free radical initiators such as hydrogen peroxide, potassium or ammonium peroxydisulfate, dibenzoyl peroxide, lauryl peroxide, ditertiarybutyl peroxide, 2,2'-azobisisobutyronitrile, etc., either alone or together with one or more reducing components such as sodium bisulfite, sodium metabisulfite, glucose, ascorbic acid, erythorbic acid, etc. The reaction is continued with agitation at a temperature sufficient to maintain an adequate reaction rate until most or all monomers are consumed. Monomer addition is usually continued until the latex reaches a polymer concentration of about 20 to about 70 weight percent.

Physical stability of the dispersion usually is achieved by providing in the aqueous reaction medium one or more nonionic, anionic, and/or amphoteric surfactants including copolymerizable surfactants such as sulfonated alkylphenol polyalkyleneoxy maleate and copolymerizable stabilizers such as sulfoethyl methacrylate, alkenyl sulfonates, etc. Illustrative of nonionic surfactants are alkylpolyglycol ethers such as ethoxylation products of lauryl, oleyl, and stearyl alcohols or mixtures of such alcohols as coconut fatty alcohols; alkylphenol polyglycol ethers such as ethoxylation products of octyl- or nonylphenol, diisopropylphenol, triisopropylphenol, di- or tritertiarybutyl phenol, etc. Illustrative of anionic surfactants are alkali metal or ammonium salts of alkyl, aryl, or alkylaryl sulfonates, sulfates, phosphates, phosphonates, etc. Examples include sodium lauryl sulfate, sodium octylphenol glycolether sulfate, sodium dodecylbenzene sulfonate, sodium lauryldiglycol sulfate, and ammonium tritertiarybutylphenol penta- and octa-glycol sulfates.

Protective colloids may be added to the aqueous polymer dispersions either during or after the reaction period. Illustrative protective colloids include gum arabic, starch, alginates, and modified natural substances such as methyl-, ethyl-, hydroxyalkyl-, and carboxymethylcellulose, and synthetic substances such as polyvinyl alcohol, polyvinyl pyrrolidone, and mixtures of two or more of such substances. Filler and/or extender such as dispersible clays, and colorants, such as pigments and dyes, can also be added to the aqueous dispersions either during or after polymerization. Those skilled in the art of emulsion polymers will appreciate that protective colloids, tackifiers, and other additives should be compatible with the polymer emulsion to assure formation of a stable dispersion.

The emulsions typically contain about 20 to about 70 percent polymer as manufactured, while preferred latexes typically have solids contents of about 40 to about 60 weight percent polymer solids. The dispersed polymer particles can be of any size suitable for the intended use, although particle sizes of at least about 100 nanometers are presently preferred. Most often, the described latexes will have particle sizes within the range of about 100 to about 1000 nanometers.

The pressure-sensitive adhesives can be applied to any backing which it is desired to adhere to another surface or article. Illustrative backings include flexible and rigid, natural and synthetic materials such as plastics, elastomers, solid metals and foils, ceramics (tiles, glass, etc.), wood, papers and cardboard, leather materials, etc. of essentially any form including films, solid articles, woven and non-woven textile materials, etc. Illustrative uses of such articles include wall coverings (paper, fabric, films, etc.), upholstery items, construction roofing and siding materials, tapes of all varieties (including those having backing comprised of woven or non-woven fabrics, paper, polymeric films, metal, foils, foams, etc., including double-faced tapes and so-called transfer tapes), packaging, floor and wall tile and other floor and wall coverings, panelling, etc. Suitable backing and substrate materials can be of essentially any chemical composition and include metals, ceramics (including all varieties of glass), and natural and synthetic polar and non-polar materials such as polyolefins, e.g., homopolymers and interpolymers of substituted and nonsubstituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid ester (including thio esters), amides, amines, etc. Essentially all natural materials include one or more polar functional groups. Illustrative are virgin and reclaimed cellulosic fibers such as cotton, paper, wood, coconut fiber, jute, hemp, etc. and proteinaceous materials such as leather, wool, and other animal fur. Illustrative synthetic materials containing polar functional groups are polyesters, polyamides, carboxylated styrene-butadiene polymers, etc., such as Nylon-6, Nylon66, Nylon-610, "Dacron", "Fortrel", "Kodel", "Acrilan", "Orlon", "Creslan", "Verel" and "Dynel". Illustrative of other useful polar materials are synthetic carbon, silicon, and magnesium silicate.

The adhesive compositions may be applied to the backing by any one of a variety of conventional coating techniques such as roll coating, spray coating, curtain coating, etc. While primers my be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For example, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds dry adhesive per 3,000 square feet of treated surface are generally adequate. Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

The invention is further described by the following examples which are illustrative of specific modes of practicing the invention and are not intended as limiting the scope of the invention as defined by the appended claims.

TEST STANDARDS

Test samples were prepared by applying to a 1-mil oriented polypropylene (OPP) backing a film of adhesive latex which, when cured, forms a 1-mil adhesive layer. Emulsion polymers were applied in layers of 1.5-mil and dried at 150° F. for 5 minutes, covered with release liner and aged 24 hours at 75° F. and 50 percent relative humidity.

Shear strength was determined in accordance with ASTM D3654-88, PSTC-7 and is a measure of the cohesive strength of an adhesive. ("PSTC" designates the pressure-sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a one-half inch by one inch portion of the strip is in firm contact with the panel with one end portion of the strip being free. The steel panel, with the coated strip attached, is held in a rack such that the panel forms an angle of 178° to 180° with the extended tape free end which is then tensioned by the application of a force of 1000 grams applied as a hanging weight from the free end of the test strip. The elapsed time, in hours, required for each test strip to separate from the test panel at 75° F. is recorded as the shear strength.

Peel adhesion was determined in accordance with ASTM D-3330-90, PSTC-1 and is a measure of the force required to remove a coated, flexible sheet material from a test panel at a specific angle and rate of removal. Unless otherwise specified, the values for peel adhesion reported herein are force values expressed as ounces per inch width of coated test sheet material determined at 75° F. by the following procedure. A one-inch width of coated sheet is applied to a horizontal surface of a clean, stainless steel test plate with at least five lineal inches of coated sheet material in firm contact with the steel plate. A hard rubber roller is used to firmly apply the strip and remove all discontinuities and entrapped air. The free end of the coated strip is then doubled back nearly touching itself so that the angle of removal from the steel plate will be 180°. The free end of the test strip (the one pulled) is attached to the adhesion tester arm (an Instrumetors slip/peel tester). The test plate is then attached to the moving bed of the tester, which moves away from the arm at a rate of 12 inches per minute. The scale reading in ounces is recorded as the tape is peeled from the steel surface.

Probe tack was measured in accordance with ASTM D 2979-88, and is the maximum force required to break an adhesive bond, which was formed at a fixed pressure and dwelled for a given time. Unless otherwise specified values reported for tack are in grams, and were obtained at 75° F. by the following procedure. A sample of coated material was affixed to a 20 gram annular ring and introduced into the probe tack tester (Polyken Probe Tack Tester, Testing Machines, Inc.). The test proceeded by approach of a stainless steel probe to the specimen at a rate of 1 centimeter per second, followed by a 1 second dwell. The force (in grams) necessary to remove the probe from the adhesive, or break the adhesive bond, was registered as the probe tack.

EXAMPLE 1

Polymer A was prepared from a monomer mixture containing 457.5 grams of water, 16.4 grams of a 23% solution of sodium dodecyl benzene sulfonate, 1550 grams of butyl acrylate, 29.9 grams of methacrylic acid, 83.2 grams of acetoacetoxyethyl methacrylate, and 0.83 grams of n-dodecyl mercaptan. In a kettle containing a mixture of 1038.3 grams of water and 0.82 grams of sodium carbonate heated to 85° C. was added 52.5 grams of a 44.6% solids, small particle size BA/MMA/MAA emulsion polymer. An initiator charge of 6.7 grams of sodium persulfate dissolved in 15 grams of water was added. The monomer emulsion was then gradually added over a three hour period along with 2.25 grams of sodium persulfate dissolved in 67.5 grams of water in a separate feed. After the three hour period, the emulsion was cooled to 60° C. at which point 1.5 grams of t-butyl hydroperoxide dissolved in 4.5 grams of water was added followed by 0.75 grams of isoascorbic acid dissolved in 18.8 grams of water. This process was repeated twice at 20 minute intervals. The latex was then cooled to ambient temperature.

The resulting latex was treated with aqueous ammonia to achieve pH values of 4, 5, 6, 7, 8, 9 and 10, and the samples then allowed to equilibrate. After 24 hours, the pH of each sample was remeasured, the results of which are summarized in Table 1. The samples taken to high pH were found to exhibit a considerable drop in pH, consistent with ammonia consumption in the formation of the enamine of the AAEM. The latex polymers were then cast and tested as described above, with the results set forth in Table 2. Tack and peel were found not to deviate from their respective mean values, 540 grams and 38 ounces per inch, over the full range of pH; however, the cohesive strength, as indicated by the shear holding time, was dramatically improved from 4 hours at pH 4 to 54 hours at pH 10.

EXAMPLE 2

Polymer B was prepared in a similar manner to Polymer A using a monomer mixture containing 457.5 grams of water, 16.4 grams of a 23% solution of sodium dodecyl benzene sulfonate, 1550 grams of butyl acrylate, 29.9 grams of methacrylic acid, 83.2 grams of acetoacetoxyethyl methacrylate, and 1.66 grams of n-dodecyl mercaptan.

The resulting latex was treated with aqueous ammonia to achieve pH values of 4, 5, 6, 7, 8, 9 and 10, and the samples then allowed to equilibrate. After 24 hours, the pH of each sample was remeasured, the results of which are summarized in Table 1. The samples taken to high pH were found to exhibit a considerable drop in pH, consistent with ammonia consumption in the formation of the enamine of the AAEM. The latex polymers were then cast and tested as described above, with the results set forth in Table 2. Tack and peel were found not to deviate from their respective mean values, 530 grams and 41 ounces per inch, over the full range of pH; however, the cohesive strength, as indicated by the shear holding time, was dramatically improved from 2 hours at pH 4 to 141 hours at pH 10.

EXAMPLE 3

Polymer C was prepared in a similar manner to Polymer A using a monomer mixture containing 457.5 grams of water, 16.4 grams of a 23% solution of sodium dodecyl benzene sulfonate, 1181.4 grams of 2-ethylhexyl acrylate, 416 grams of methyl acrylate, 33.3 grams of acrylic acid and 33.3 grams of acetoacetoxyethyl methacrylate.

The resulting latex was treated with aqueous ammonia to achieve pH values of 4, 5, 6, 7, 8, 9 and 10, and the samples then allowed to equilibrate. After 24 hours, the pH of each sample was remeasured, the results of which are summarized in Table 1. The samples taken to high pH were found to exhibit a considerable drop in pH, consistent with ammonia consumption in the formation of the enamine of the AAEM. The latex polymers were then cast and tested as described above, with the results set forth in Table 2. Tack and peel were found not to deviate from their respective mean values, 340 grams and 21 ounces per inch, over the full range of pH. Changes in the cohesive strength, as indicated by the shear holding time, were not readily determined for this polymer, as the test method used in the present case, as well as in U.S. Pat. No. 4,759,983, is unable to distinguish the effects of changes in pH.

TABLE 1

| | Monomers, % | Starting pH | Final pH |
|---|---|---|---|
| Polymer A | 93.2BA; 1.8 MAA; 5AAEM; chain transfer-0.05 n-DDM | 4 | 4.0 |
| | | 5 | 5.0 |
| | | 6 | 5.9 |
| | | 7 | 6.9 |
| | | 8 | 7.1 |
| | | 9 | 7.9 |
| | | 10 | 10 |
| Polymer B | 93.2BA; 1.8MAA; 5AAEM; chain transfer −0.10 n-DDM | 4 | 4.1 |
| | | 5 | 5.0 |
| | | 6 | 6.0 |
| | | 7 | 6.5 |
| | | 8 | 7.2 |
| | | 9 | 7.8 |
| | | 10 | 9.6 |
| Polymer C | 71 2-EHA; 25MA; 2AA; 2AAEM | 4 | 4.0 |
| | | 5 | 5.1 |
| | | 6 | 6.0 |
| | | 7 | 6.9 |
| | | 8 | 7.5 |
| | | 9 | 8.1 |

TABLE 1-continued

| | Monomers, % | Starting pH | Final pH |
|---|---|---|---|
| | | 10 | 9.6 |

TABLE 2

| | Starting pH | Tack | Peel | Shear |
|---|---|---|---|---|
| Polymer A | 4 | 660 | 42 | 4.0 |
| | 5 | 440 | 36 | 3.8 |
| | 6 | 610 | 40 | 7.3 |
| | 7 | 590 | 45 | 6.1 |
| | 8 | 560 | 39 | 12.4 |
| | 9 | 450 | 36 | 45.1 |
| | 10 | 440 | 26 | 53.7 |
| Polymer B | 4 | 530 | 41 | 2.3 |
| | 5 | 540 | 39 | 4.1 |
| | 6 | 610 | 41 | 14.6 |
| | 7 | 540 | 38 | 33.8 |
| | 8 | 500 | 42 | 72.1 |
| | 9 | 490 | 41 | 106.5 |
| | 10 | 530 | 48 | 141.8 |
| Polymer C | 4 | 340 | 21 | 48.3 |
| | 5 | 360 | 22 | >400 |
| | 6 | 330 | 19 | >400 |
| | 7 | 360 | 14 | >400 |
| | 8 | 330 | 17 | >400 |
| | 9 | 360 | 15 | >400 |
| | 10 | 320 | 17 | >400 |

We claim:

1. A pressure-sensitive adhesive comprising a polymer prepared by free radical emulsion polymerization having a Tg below about 0° C. and having pendent acetoacetate functional groups wherein the pendent acetoacetate groups have been reacted with ammonia or a primary amine to form an enamine-containing composition at a pH greater than 9.

2. The pressure-sensitive adhesive of claim 1, wherein the amount of acetoacetate functional monomer in the polymer is from about 0.05 to about 10 weight percent.

3. The pressure-sensitive adhesive of claim 1, wherein the amount of acetoacetate functional monomer in the polymer is from about 0.5 to about 5 weight percent.

4. The pressure-sensitive adhesive of claim 1, wherein the amount of acetoacetate functional monomer in the polymer is from about 1 to about 5 weight percent.

* * * * *